United States Patent
Kelly et al.

(10) Patent No.: US 7,396,487 B2
(45) Date of Patent: Jul. 8, 2008

(54) LIQUID CRYSTAL COMPOUNDS

(75) Inventors: Stephen M Kelly, Hull (GB); Warren L Duffy, Chilworth (GB); Neil L Campbell, Bangor (GB)

(73) Assignee: QinetiQ Limited, London (GB)

( * ) Notice: Subject to any disclaimer, the term of this patent is extended or adjusted under 35 U.S.C. 154(b) by 513 days.

(21) Appl. No.: 10/503,346

(22) PCT Filed: Jan. 27, 2003

(86) PCT No.: PCT/GB03/00305

§ 371 (c)(1), (2), (4) Date: Aug. 2, 2004

(87) PCT Pub. No.: WO03/064381

PCT Pub. Date: Aug. 7, 2003

(65) Prior Publication Data

US 2005/0072963 A1    Apr. 7, 2005

(30) Foreign Application Priority Data

Jan. 31, 2002    (GB) .................................. 0202201.0

(51) Int. Cl.
- *C09K 19/30* (2006.01)
- *C09K 19/12* (2006.01)
- *C09K 19/02* (2006.01)
- *C07C 69/76* (2006.01)

(52) U.S. Cl. .......................... 252/299.63; 252/299.65; 252/299.66; 349/182; 560/84; 560/86

(58) Field of Classification Search ............ 252/299.63, 252/299.65, 299.66; 349/182; 558/410; 560/84, 86

See application file for complete search history.

(56) References Cited

U.S. PATENT DOCUMENTS 4,707,296 A * 11/1987 Sugimori et al. ........ 252/299.67

FOREIGN PATENT DOCUMENTS

EP    0 047 453 A    3/1982

(Continued)

OTHER PUBLICATIONS

CAPLUS Abstract Accession No. 2001:810756 & Trends in Optics and Photonics vol. 62 (Photorefractive Effects, Materials and Devices), 2001, J C Ribierre et al, "Evidence for mechanical properties ruling dielectric and electro-optical properties in various low TG photorefractive doped polymers". pp. 359-365.

(Continued)

*Primary Examiner*—Taylor Victor Oh
(74) *Attorney, Agent, or Firm*—Nixon & Vanderhye P.C.

(57) ABSTRACT

A compound of formula (I): where $R^1$ is alkyl or alkenyl, $Y^1$ and $Y^2$ are independently selected from oxygen or sulphur, n is an integer of from 1 to 5, A is an optionally substituted phenyl or an optionally substituted cycloalkyl ring, X is a direct bond, a $C_{1-4}$alkylene, a $C_{2-4}$alkenylene, an acetylene, —CO(O)— or a group of sub-formula (i): where $X^1$ and $X^2$ are independently selected from a direct bond, a $C_{1-4}$alkylene, a $C_{2-4}$alkenylene, an acetylene, —CO(O)— and $R^2$, $R^3$ and $R^4$ are independently selected from hydrogen, halo or cyano, provided that no more than one of $R^2$, $R^3$ and $R^4$ is hydrogen. These compounds have a high dipole moment and may be used as dopants in liquid crystal mixtures.

26 Claims, 1 Drawing Sheet

FOREIGN PATENT DOCUMENTS

| | | |
|---|---|---|
| EP | 0 385 471 A | 9/1990 |
| EP | 0 731 155 A | 9/1996 |
| WO | 87/07266 A | 12/1987 |

OTHER PUBLICATIONS

CAPLUS Abstract Accession No. 1999:691973 & Journal of Imaging Science and Technology vol. 43, No. 5, 1999, B Kippelen et al, Photorefractive polymer composites with short response times, pp. 405-412.

CAPLUS Abstract Accession No. 1999:538241 & Proceedings of SPIE-The International Society for Optical Engineering vol. 3749 (18th Congress of the International Commission for Optics: Optics for the Next Millennium, 1999), 1999, G Eric et al, "Photorefractive polymers with video-rate performance", pp. 336-337.

CAPLUS Abstract Accession No. 1997:568954 & Chromatographia vol. 46, No. ½, 1997, A Malik et al, "Dicyanobiphenyl polysiloxane stationary phases for capillary column gas chromatography", pp. 79-84.

CAPLUS Abstract Accession No. 1984:463769 & JP 59025872 A2 (Sharp) Sep. 2, 1984.

CAPLUS Abstract Accession No. 1983:34387 & JP 57142955 A2 (Chisso) Mar. 9, 1982.

\* cited by examiner

LIQUID CRYSTAL COMPOUNDS

This application is a 371 of PCT International application No. PCT/GB03/00305, filed 27 Jan. 2003, which designated the US and claims priority to GB Application No. 0202201.0, filed 31 Jan. 2002. The entire contents of these applications are incorporated herein by reference.

The present invention relates to novel compounds, which have the properties of liquid crystals together with processes for their preparation and liquid crystal devices incorporating them.

The term "liquid crystals" is well known. It refers to compounds which, as a result of their structure, will align themselves in a similar orientation, preferably at working temperatures, for example of from −40 to 200° C. These materials are useful in various devices, in particular the liquid crystal display devices or LCDs.

Liquid crystals can exist in various phases. In essence there are three different classes of liquid crystalline material, each possessing a characteristic molecular arrangement. These classes are nematic, chiral nematic (cholesteric) and smectic.

Broadly speaking, the molecules of nematic compounds will align themselves in a particular orientation in a bulk material. Smectic materials, in addition to being orientated in a similar way, will align themselves closely in layers.

A wide range of smectic phases exists, for example smectic A and smectic C. In the former, the molecules are aligned perpendicularly to a base or support, whilst in the latter, molecules may be inclined to the support. Some liquid crystal materials possess a number of liquid crystal phases on varying the temperature. Others have just one phase. For example, a liquid crystal material may show the following phases on being cooled from the isotropic phase: —isotropic—nematic—smectic A—smectic C—solid. If a material is described as being smectic A then it means that the material possesses a smectic A phase over a useful working temperature range.

Such materials are useful, in particular in display devices where their ability to align themselves and to change their alignment under the influence of voltage, is used to impact on the path of polarised light, thus giving rise to liquid crystal displays. These are widely used in devices such as watches, calculators, display boards or hoardings, computer screens, in particular laptop computer screens etc. The properties of the compounds which impact on the speed with which the compounds respond to voltage charges include molecule size, viscosity (Δn), dipole moments (Δε), conductivity etc.

A number of previous patents and applications such as EP-A-0047453, EP 0731155, EP-A-0385471 and U.S. Pat. No. 4,707,296 have described liquid crystal compounds which include an alkoxyalkoxy group at one end of the molecule.

The applicants have found that a combination of an alkoxyalkoxy group at one end of a molecule, and a highly polar multiply-substituted ring at the other end of the molecule gives a particularly good dipole moment, which may be particularly useful in certain liquid crystal devices.

DESCRIPTION OF THE INVENTION

Figure 1:
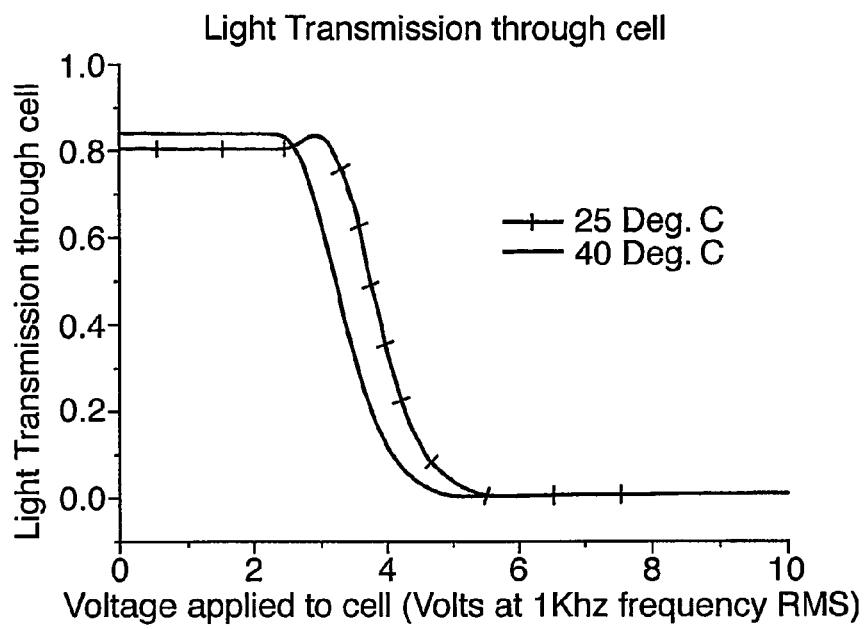
FIG. 1 is a graph showing the switching behavior of Mixture 2 (see Tables 3 and 4) measured as light transmission through cell versus voltage applied to cell.

According to the present invention there is provided a compound of formula (I)

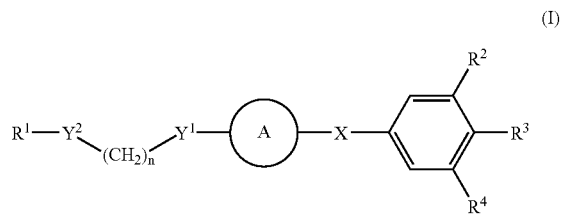

(I)

where $R^1$ is alkyl or alkenyl, $Y^1$ and $Y^2$ are independently selected from oxygen or sulphur, n is an integer of from 1 to 5, A is an optionally substituted phenyl or an optionally substituted cycloalkyl ring, X is a direct bond, a $C_2$ or $C_4$alkylene, a $C_2$ or $C_4$alkenylene, an acetylene, —CO(O)—, or a group of sub-formula (i)

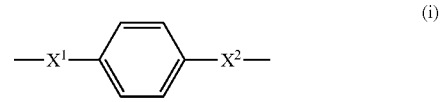

(i)

where $X^1$ and $X^2$ are independently selected from a direct bond, a $C_{1-4}$alkylene, a $C_{2-4}$alkenylene, an acetylene or —CO(O)— and $R^2$, $R^3$ and $R^4$ are independently selected from hydrogen, halogen or cyano, provided that no more than one of $R^2$, $R^3$ and $R^4$ is hydrogen and that where A is unsubstituted phenyl and $Y^1$ and $Y^2$ are both oxygen, then:

(a) where X is a direct bond, $R^2$-$R^4$ together represent other than either two cyano groups or two halogen atoms when R is ethyl;

(b) where X is —CO(O)—, $R^2$-$R^4$ together represent other than one halogen and one cyano group, and (c) where X is an acetylene group, $R^2$-$R^4$ together represent other than one cyano group and two halogen atoms.

Compounds of formula (I) are compounds which have a high ΔE value, and are therefore particularly useful as dopants which increase the ΔE value of liquid crystal compounds and particularly nematic mixtures. Certain of the compounds, and in particular those with three rings, may themselves have liquid crystal properties.

As used herein the term "alkyl" refers to straight or branched chain alkyl groups, suitably containing up to 20, more suitably up to 10 and preferably up to 6 carbon atoms. The term "alkylene" refers to alkyl groups which are divalent and "cycloalkyl" refers to alkyl groups which have at least 3 carbon atoms, and which are cyclic in structure. The term "alkenyl" refers to straight or branched unsaturated chains having from 2 to 20 and preferably from 2 to 10 carbon atoms. The term "alkenylene" refers to divalent alkenyl groups. The term "aryl" refers to aromatic rings such as phenyl and naphthyl, but preferably phenyl.

The term "halo" includes fluoro, chloro, bromo or iodo.

Suitable optional substituents for the ring A include halo such as fluoro. Preferably, the ring A is unsubstituted.

Suitably the rings A are six membered rings in particular, phenyl or cyclohexyl. They are preferably joined in a para orientation when the groups are aromatic, and in an 1,4-orientation when the rings are non-aromatic. Thus preferred groups A are 1,4-phenylene or 1,4-cyclohexyl. Where A is a cycloalkyl ring such as cyclohexyl, the available bonds are preferably in a trans relationship as illustrated in sub-formula (ii)

(ii)

In particular, in the compounds of formula (I), A is a 1,4-phenylene group.

Where X is a group of sub-formula (i), the compounds of formula (I) have a relatively low viscosity as compared to compounds of formula (I) which include only two rings. However the clearing point of such compounds would also be higher. Preferably in such compounds $X^1$ and $X^2$ are both direct bonds.

Where X is a $C_{2-4}$alkenylene chain, it is suitably a group of sub-formula (iii), (iv) or (v).

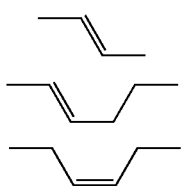

(iii)
(iv)
(v)

In particular, X is a direct bond, —CO(O)— or acetylene, and most preferably is a direct bond or a group —CO(O)—. In particular, X is a group —C(O)O—.

Thus a preferred sub-group of compounds of formula (I) are compounds of formula (II)

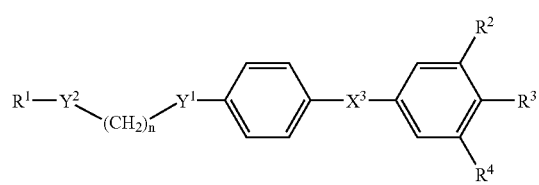

(II)

where $R^1$, $Y^2$, n, $Y^1$, $R^2$, $R^3$ and $R^4$ are as defined above, $X^3$ is a direct bond, —CO(O)—, acetylene, and most preferably a direct bond or a group —CO(O)—. In particular, $X^3$ is a group —C(O)O—.

Suitably $R^1$ is $C_{1-10}$alkyl, preferably $C_{1-6}$alkyl, and most preferably $C_{1-3}$alkyl such as methyl.

Preferably $Y^1$ and $Y^2$ are oxygen.

Preferably n is 2.

Where $R^2$, $R^3$ and/or $R^4$ are halo, they are suitably chloro or fluoro and most preferably fluoro.

Preferably, $R^3$ is other than hydrogen.

In one embodiment, one of $R^2$, $R^3$ or $R^4$ is cyano.

In a particularly preferred embodiment, $R^2$, $R^3$ and $R^4$ are all halo and in particular are all fluoro.

Particularly preferred compounds of formula (I) are listed in Table 1 below

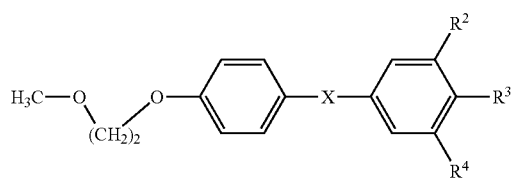

| Compound No. | X | $R^2$ | $R^3$ | $R^4$ |
|---|---|---|---|---|
| 1 | bond | F | CN | H |
| 2 | bond | CN | F | H |
| 3 | bond | F | F | H |
| 4 | C(O)O | F | CN | F |
| 5 | C(O)O | F | F | F |

Compounds of formula (I) can be prepared by methods known in the art. For example, where X is an ester link of formula —C(O)O—, the compounds can be prepared by reacting an appropriate acid with a phenol. For instance these compounds may be prepared by reacting a compound of formula (III) with a compound of formula (IV)

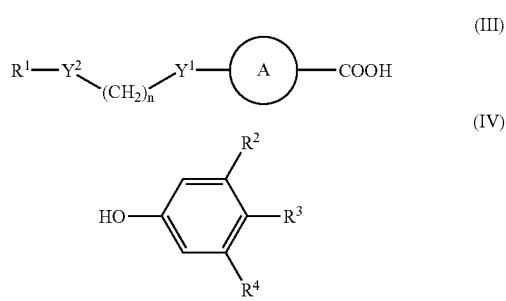

(III)
(IV)

where $R^1$, $R^2$, $R^3$, $R^4$, $Y^1$, $Y^2$, A and n are as defined above in relation to formula (I). The reaction is suitably effected in an organic solvent such as dichloromethane, in the presence of a base and/or a coupling agent. In particular the reaction can be conducted using a combination of the coupling agent N,N-dicyclohexylcarbodiimide, and a weak base, such as 4-(dimethylamino)pyridine.

Alternatively, the compounds of formula (I) can be prepared by reacting a compound of formula (V)

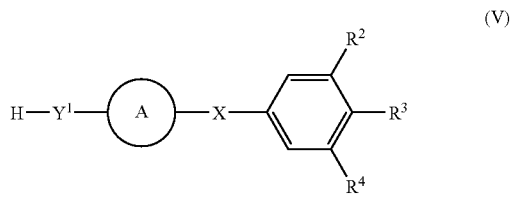

(V)

wherein $Y^1$, A, X, $R^2$, $R^3$ and $R^4$ are as defined above in relation to formula (I) with a compound of formula (VI)

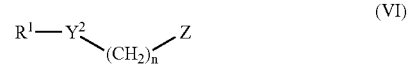

(VI)

wherein $R^1$, $Y^2$ and n are as defined in relation to formula (I) and Z is a leaving group.

The reaction is suitably effected in an organic solvent such as butanone or tetrahydrofuran in the presence of a base such as an alkali metal carbonate such as potassium carbonate, and an alkali metal iodide such as potassium iodide, as well as a strong base such as an alkali metal hydride for instance, sodium hydride. Suitable leaving groups Z include halo such as chloro, bromo or iodo, mesylate and tosylate, and in particular are halo groups such as bromo.

Compounds of formula (III), (IV), (V) and (VI) are either known compounds or they can be prepared from known compounds by methods described in the literature.

The liquid crystal compounds of the invention may be used in mixture with liquid crystal compounds which may or may not comprise compounds of formula (I). Compounds of formula (I) have high $\Delta E$ values and may be used as dopants to increase the $\Delta E$ values of nematic mixtures. When added to nematic mixtures as dopants, they will lower the threshold voltage without destroying the liquid crystalline properties of the mixture of increasing its viscosity and hence response time too much. Thus they may be used in a variety of liquid crystal devices including liquid crystal display (LCD) cells. They may be particularly useful in twisted nematic (TN)-LCDs and supertwist nematic STN-LCDs where low threshold voltages and operating voltages are required. Such devices form a further aspect of the invention.

The invention will now be particularly described by way of example.

EXAMPLE 1

Preparation of Compound 5 in Table 1

Step 1

The Synthesis of 4-(2-methoxyethoxy)benzoic Acid

4-Hydroxybenzoic acid (3.00 g, $2.17 \times 10^{-2}$ mol) was dissolved in a mixture of ethanol (15 cm$^3$) and potassium hydroxide (3.22 g, $5.64 \times 10^{-2}$ mol) in water (5 cm$^3$). The solution was then heated gently and stirred before 1-bromo-2-methoxyethane (3.32 g, $2.39 \times 10^{-2}$ mol) and potassium iodide (0.01 g, $6.02 \times 10^{-5}$ mol) was added slowly. The resulting reaction mixture was then refluxed (15 hrs) and the solvent evaporated and the resulting solid residue dissolved in water (50 cm$^3$). The solution was washed with ether and then made strongly acidic with hydrochloric acid. The resulting precipitate was isolated and recrystallised from ethanol. Yield 1.36 g (32%).

Mpt=154° C.

Step 2

The Synthesis of 3,4,5-trifluorophenyl 4-(2-methoxyethoxy)benzoate (Compound 5 in Table 1)

A solution of 3,4,5-trifluorophenol (0.38 g, $2.55 \times 10^{-3}$ mol) in dichloromethane (10 cm$^3$) was added to a solution of N,N-dicyclohexylcarbodiimide (0.63 g, $3.06 \times 10^{-3}$ mol), 4-(2-methoxyethoxy)benzoic acid (0.50 g, $2.55 \times 10^{-3}$ mol), 4-(dimethylamino)pyridine (0.03 g $2.55 \times 10^{-4}$ mol) in dichloromethane (5 cm$^3$), at 0° C. and then left to stirred overnight, filtered to remove precipitated material (DCU) and the filtrate evaporated down under reduced pressure. The crude product was purified by column chromatography on silica gel using a 1:1 dichloromethane-petroleum ether (40°-60° C.) mixture as eluent, followed by recrystalisation from ethanol. Yield 0.32 g (38%), GC purity (99.76%).

Mpt=75° C.

Compound 4 in Table 1 was prepared in an analogous manner.

EXAMPLE 2

The Synthesis of 3,4-difluoro-4'-(2-methoxyethoxy)biphenyl (Compound 3 in Table 1)

A mixture of 3,4-difluoro-1,1'-biphenyl-4-ol (0.50 g, $2.43 \times 10^{-3}$ mol) of 1-bromo-2-methoxyethane (0.34 g, $2.43 \times 10^{-3}$ mol), potassium iodide (0.04 g, $2.43 \times 10^{-4}$ mol), potassium carbonate (1.34 g, $9.72 \times 10^{-3}$ mol) and butanone (20 cm$^3$) was then heated overnight under reflux. The mixture was filtered to remove inorganic material and the filtrate evaporated down under reduced pressure. The crude product was purified by column chromatography on silica gel using dichloromethane as the eluent and recrystallisation from hexane to give the pure (GC: 100%) desired product (0.15 g 23%).

Mpt=57° C. CHN: Expected C 68.17%, H 5.34%. Results C 68.01%, H 5.22%.
$^1$H NMR (CDCl$_3$) $\delta_{400}$: 3.47(3H, s), 3.79(2H, t), 4.17(2H, t), 7.00(2H, d t, J≈8.7 Hz), 7.15-7.26(2H, m), 7.30-7.35(1H, m), 7.44(2H, d t, J≈8.7 Hz). IR $\mu_{max}$/cm$^{-1}$: 3001, 2935, 1608, 1510, 1456, 1266, 1231, 1129, 1062, 1033, 925, 862, 820 and 524. MS m/z: 264(M$^+$, M$^{100}$), 233($C_{14}H_{11}F_2O^+$), 206 ($C_{12}H_7F_2O^+$), 188($C_{12}H_6F_2^+$).

EXAMPLE 3

The Synthesis of 4-fluoro-4'-(2-methoxyethoxy)biphenyl-3-carbonitrile (Compound No. 2 in Table 1)

A mixture of 4-fluoro-4'-hydroxy-1,1'-biphenyl-3-carbonitrile (0.50 g, $2.35 \times 10^{-3}$ mol), 1-bromo-2-methoxyethane (0.33 g, $2.35 \times 10^{-3}$ mol), potassium iodide (0.04 g, $2.35 \times 10^{-4}$ mol) and potassium carbonate (1.30 g, $9.40 \times 10^{-3}$ mol) in butanone (20 cm$^3$) was reacted, worked up and purified as described for compound 3 in Example 2. Yield 0.26 g (40%), GC purity (100%).

Mpt=94° C. $^1$H NMR (CDCl$_3$) $\delta_{400}$: 3.44(3H, s), 3.79(2H, t), 4.17(2H, t), 7.02(2H, d t, J≈8.5 Hz), 7.23-7.27(1H, m), 7.43(2H, d t, J≈8.5 Hz), 7.72-7.76(2H, m). IR $v_{max}$/cm$^{-1}$: 2929, 2239, 1610, 1494, 1450, 1242, 1121, 1065, 926, 827 and 533. MS m/z: 271(M$^+$, M$^{100}$), 240($C_{15}H_{11}OFN^+$), 213 ($C_{13}H_8OFN^+$).

EXAMPLE 4

The Synthesis of 3-fluoro-4'-(2-methoxyethoxy)biphenyl-4-carbonitrile (Compound No. 1 in Table 1)

A mixture of 3-fluoro-4'-hydroxy-1,1'-biphenyl-4-carbonitrile (0.50 g, $2.35 \times 10^{-3}$ mol), 1-bromo-2-methoxyethane (0.33 g, $2.35 \times 10^{-3}$ mol), potassium iodide (0.04 g, $2.35 \times 10^{-4}$ mol) and potassium carbonate (1.30 g, $9.40 \times 10^{-3}$ mol) in butanone (20 cm$^3$) was reacted, worked up and purified as described for compound 3 in Example 2. Yield 0.40 g (63%), GC purity (99.86%).

Mpt=83° C. CHN: Expected C 70.84%, H 5.20%, N 5.16%. Results C 71.01%, H 5.25%, N 5.26%. $^1$H NMR (CDCl$_3$) $\delta_{400}$: 3.47(3H, s), 3.79(2H, t), 4.18(2H, t), 7.04(2H, d t, J≈8.5 Hz), 7.41(2H, d quartet, J≈8.2 Hz), 7.52(2H, d t, J≈8.5 Hz), 7.64(1H, d d). IR $v_{max}$/cm$^{-1}$: 2934, 2234, 1614, 1493, 1438, 1257, 1123, 1062, 928, 822 and 522. MS m/z: 271(M$^+$, M$^{100}$), 240(C$_{15}$H$_{11}$OFN$^+$), 213(C$_{13}$H$_8$OFN$^+$).

EXAMPLE 5

Properties

The transition temperatures in ° C. for the phases of the compounds of the invention were tested using conventional methods and equipment. The results are summarised in Table 2.

TABLE 2

| Compound No | Cr | | I |
|---|---|---|---|
| 1 | • | 83 | • |
| 2 | • | 94 | • |
| 3 | • | 57 | • |
| 4 | • | 72 | • |
| 5 | • | 75 | • |

Dipole Moments

These may be either measured experimentally or calculated using molecular modelling techniques. For example the molecular modelled dipole moment μ(D) for Compound No 4 in Table 1 is 8.50 and it was measured as μ 7.63 Debye.

EXAMPLE 6

Liquid Crystal Properties of Mixtures

Compounds of the invention were added to a general liquid crystal host mixture comprising ethyl linked phenyl cyclohexanes in an amount of 10% and the properties of the mixtures were tested using conventional methods.

Clearing Points

These were measured with the results reproduced in Table 3.

TABLE 3

| Mixture No. | Mixture | Clearing point ° C. |
|---|---|---|
| 1 | Host mixture | 53.4 |
| 2 | Host mixture + 10% compound No 5 | 52.1 |
| 3 | Host mixture + 10% compound No 6 | 50.4 |

Compounds of the invention therefore have the effect of reducing the clearing point of liquid crystal mixtures.

Birefringence Measurements

Refractive indices and birefringence for the mixtures over various temperatures were measured and the results are shown in Tables 4 and 5. In these tables, "ne" signifies the extraordinary refractive indices, and "no" the ordinary refractive indices as understood in the art. Measurements were made on an Abbé refractometer.

TABLE 4

Mixture No 2 (see Table No 3)

| Temperature ° C. | ne | No | Birefringence |
|---|---|---|---|
| 50.91 | 1.48973 | 1.5492 | 0.05946 |
| 49.9 | 1.48896 | 1.55207 | 0.06311 |
| 44.96 | 1.48663 | 1.56377 | 0.07714 |
| 39.93 | 1.48625 | 1.57101 | 0.08476 |
| 34.98 | 1.48615 | 1.57782 | 0.09167 |
| 29.99 | 1.48675 | 1.58253 | 0.09578 |
| 25.06 | 1.48738 | 1.5876 | 0.10021 |
| 20.05 | 1.48801 | 1.5914 | 0.10338 |
| 15.06 | 1.48892 | 1.59548 | 0.10655 |
| 10.07 | 1.48996 | 1.59933 | 0.10937 |

TABLE 5

Mixture No 3 (see Table No 3)

| Temperature ° C. | ne | No | Birefringence |
|---|---|---|---|
| 48.91 | 1.49196 | 1.54367 | 0.05171 |
| 44.95 | 1.48812 | 1.55547 | 0.06735 |
| 39.95 | 1.48665 | 1.56604 | 0.07939 |
| 34.98 | 1.48653 | 1.57292 | 0.08638 |
| 29.97 | 1.48667 | 1.57879 | 0.09212 |
| 25.06 | 1.48725 | 1.5838 | 0.09656 |
| 20.06 | 1.4879 | 1.58876 | 0.10085 |
| 15.05 | 1.4888 | 1.59258 | 0.10378 |
| 10.08 | 1.48962 | 1.59627 | 0.10665 |

These results show acceptable birefringence properties for the mixtures.

Switching Behaviour

Figure 2:
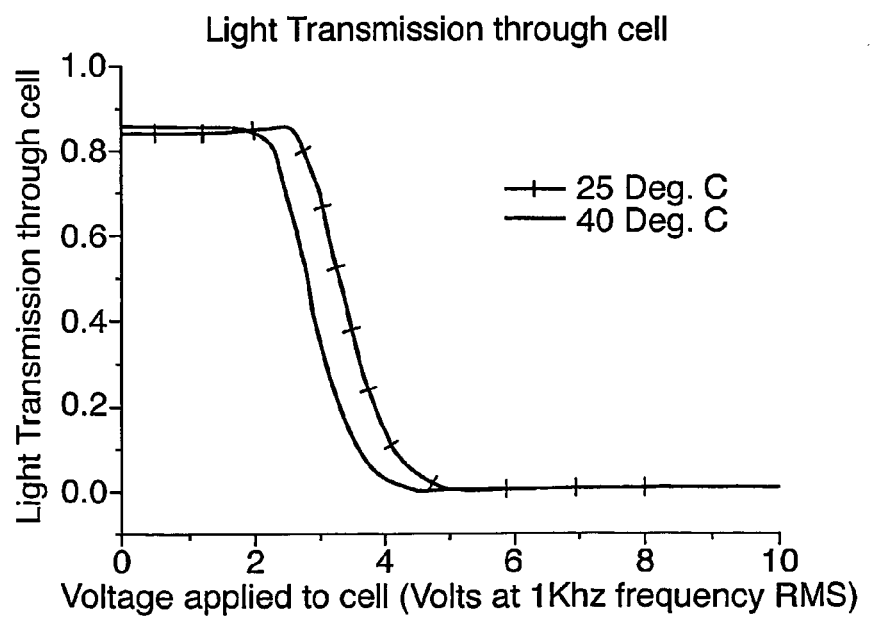
FIG. 2 is a graph showing the switching behavior of Mixture 3 (see Tables 3 and 5) measured as light transmission through cell versus voltage applied to cell.

The switching behaviour the mixtures was measured in a 6 μm cell using polyimide 32 alignment. Results are shown in FIGS. 1 and 2, where FIG. 1 shows the results with Mixture 2 in Table 3 and FIG. 2 shows the results with Mixture 3 in Table 3.

Dielectric Anisotropy

This property of the mixtures defined in Table 3 above were measured and the results given in Table 6.

TABLE 6

| Mixture No | Epar | εperp | Δε |
|---|---|---|---|
| 2 | 13.495 | 5.513 | 7.98 |
| 3 | | 6.523 | |
| 1 | 12.95 | 5.13 | 7.82 |

The invention claimed is:

1. A compound of formula (I)

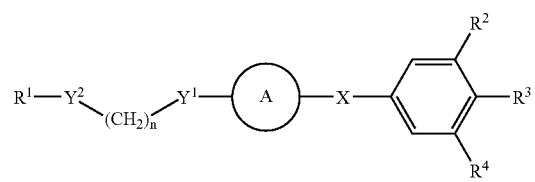

where R$^1$ is alkyl or alkenyl, Y$^1$ and Y$^2$ are independently selected from oxygen or sulphur, n is an integer of from 1 to 5, A is an optionally substituted phenyl or an optionally substituted cycloalkyl ring, X is a direct bond, a $C_{1-4}$alkylene, a $C_{2-4}$alkenylene, an acetylene, —CO(O)— or a group of sub-formula (i)

(i)

where $X^1$ and $X^2$ are independently selected from a direct bond, a $C_{1-4}$alkylene, a $C_{2-4}$alkenylene, an acetylene or —CO(O)— and $R^2$, $R^3$ and $R^4$ are independently selected from hydrogen, halo or cyano, provided that no more than one of $R^2$, $R^3$ and $R^4$ is hydrogen and that where A is unsubstituted phenyl and $Y^1$ and $Y^2$ are both oxygen, then:
(a) where X is a direct bond, $R^2$—$R^4$ together represent other than either two cyano groups or two halogen atoms when $R^1$ is alkyl;
(b) where X is —CO(O)—, $R^2$—$R^4$ together represent other than one halogen and one cyano group, and
(c) where X is an acetylene group, $R^2$—$R^4$ together represent other than one cyano group and two halogen atoms.

2. A compound according to claim 1 wherein the ring A is an unsubstituted six membered ring.

3. A compound according to claim 1 wherein the ring A is a 1,4-phenylene or 1,4-cyclohexyl.

4. A compound according to claim 1 wherein X is a group of sub-formula (i) as defined in claim 1, and $X^1$ and $X^2$ are both direct bonds.

5. A compound according to claim 1 wherein X is a $C_{2-4}$alkenylene chain of sub-formula (iii), (iv) or (v).

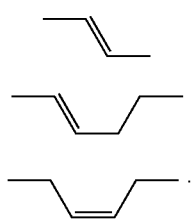

(iii)

(iv)

(v)

6. A compound according to claim 1 wherein X is a direct bond, —CO(O)— or acetylene.

7. A compound according to claim 1 wherein $R^1$ is $C_{1-3}$ alkyl.

8. A compound according to claim 1 wherein $Y^1$ and $Y^2$ are oxygen.

9. A compound according to claim 1 wherein n is 2.

10. A compound according to claim 1 wherein at least one of $R^2$, $R^3$ and/or $R^4$ is fluoro.

11. A compound according to claim 10 wherein $R^2$, $R^3$ and $R^4$ are all fluoro.

12. A compound according to claim 1 wherein $R^3$ is other than hydrogen.

13. A compound according to claim 1 wherein one of $R^2$, $R^3$ or $R^4$ is cyano.

14. A compound according to claim 1 of formula (II)

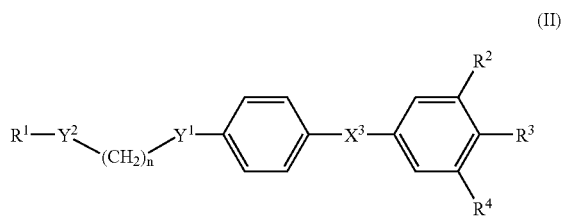

(II)

where $R^1$, $Y^2$, n, $Y^1$, $R^2$, $R^3$ and $R^4$ are as defined in claim 1, and $X^3$ is a direct bond, —CO(O)— or acetylene, subject to the relevant provisos set out in claim 1.

15. A compound according to claim 14 wherein $R^1$ is $C_{1-3}$ alkyl.

16. A compound according to claim 14 wherein $Y^1$ and $Y^2$ are oxygen.

17. A compound according to claim 14 wherein n is 2.

18. A compound according to claim 14 wherein at least one of $R^2$, $R^3$ and/or $R^4$ is fluoro.

19. A compound according to claim 18 wherein $R^2$, $R^3$ and $R^4$ are all fluoro.

20. A compound according to claim 14 wherein $R^3$ is other than hydrogen.

21. A compound according to claim 14 wherein one of $R^2$, $R^3$ or $R^4$ is cyano.

22. A process for preparing a compound of formula (I) as defined in claim 1 wherein X is a group of formula —C(O)O—, the process comprising reacting a compound of formula (III) with a compound of formula (IV)

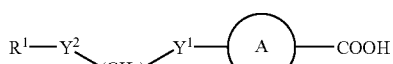

(III)

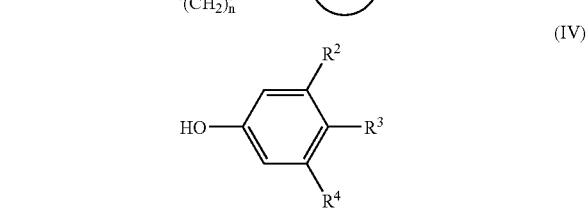

(IV)

where $R^1$, $R^2$, $R^3$, $R^4$, $Y^1$, $Y^2$, A and n are as defined above in relation to formula (I).

23. A process for preparing a compound of formula (I) as defined in claim 1 which process comprises reacting a compound of formula (V)

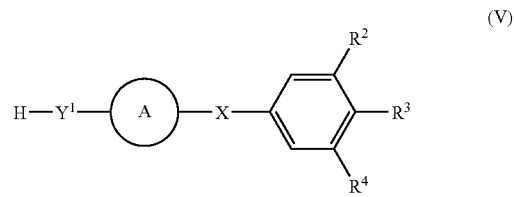

(V)

wherein $Y^1$, A, X, $R^2$, $R^3$ and $R^4$ are as defined in claim 1 with a compound of formula (VI)

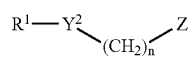 (VI)

wherein $R^1$, $Y^2$ and n are as defined in relation to formula (I) and Z is a leaving group.

24. A liquid crystal mixture comprising a compound according to claim 1.

25. A compound according to claim 1, wherein the compound is provided in a liquid crystal device.

26. A liquid crystal mixture according to claim 24, wherein the liquid crystal mixture is provided in a liquid crystal device.

* * * * *